United States Patent
Coult et al.

[11] Patent Number: 5,990,560
[45] Date of Patent: Nov. 23, 1999

[54] METHOD AND COMPOSITIONS FOR ACHIEVING A KINETICALLY CONTROLLED SOLDER BOND

[75] Inventors: David Gerald Coult, Bechtelsville, Pa.; Gustav Edward Derkits, Jr., New Providence, N.J.; John William Osenbach, Kutztown; Yiu-Man Wong, Wescosville, both of Pa.

[73] Assignee: Lucent Technologies Inc., Murray Hill, N.J.

[21] Appl. No.: 08/955,686

[22] Filed: Oct. 22, 1997

[51] Int. Cl.⁶ .................................................. H01L 23/48
[52] U.S. Cl. ........................... 257/772; 361/790; 361/737; 438/122
[58] Field of Search ..................................... 257/772, 737, 257/738, 44; 372/36, 43; 361/790; 228/208, 123.1; 438/122

[56] References Cited

U.S. PATENT DOCUMENTS 5,559,817  9/1996  Derkits, Jr. et al. ................. 257/772

*Primary Examiner*—Peter Toby Brown
*Assistant Examiner*—Roy Potter
*Attorney, Agent, or Firm*—Mathews, Collins, Shepherd & Gould, P.A.

[57] ABSTRACT

An improved method and composition for achieving a kinetically-controlled solder bond is disclosed having particular application to the fabrication of hybrid integrated circuits and optical subassemblies. The method involves the use of a solder layer, a quenching layer, and a control layer disposed between the solder layer and quenching layer, in which the control layer is advantageously comprised of a thin film of platinum. Additionally, a barrier layer, also preferably comprised of a thin film of platinum, is disposed between the solder layer and the parts to be bonded to prevent the oxidation of solder materials during the soldering process or later storage of the soldered parts.

20 Claims, 6 Drawing Sheets

METHOD AND COMPOSITIONS FOR ACHIEVING A KINETICALLY CONTROLLED SOLDER BOND

FIELD OF THE INVENTION

This invention relates to solder bonding and, in particular, to methods and compositions for achieving a kinetically-controlled solder bond. The invention has particular application to the parts bonding of laser chips to optical subassemblies.

BACKGROUND OF THE INVENTION

In fabricating hybrid integrated circuits and optical subassemblies, it is necessary to achieve high-strength bonds having high thermal and electrical conductivity between submount metallization parts and parts bonded to the submount. One method commonly used to achieve such bonds is soldering. For example, a metal mixture (a solder), is disposed between a laser chip and a substrate, and the solder is melted in contact with the two parts and then resolidified. Generally, resolidification is achieved via thermodynamic bonds, that is, by reducing the temperature of the parts and the solder, which causes the material of the solder to freeze with the material of the parts. If the parts are never again exposed to a temperature high enough to melt the solder, the bond remains solid.

One disadvantage of soldering methods involving thermodynamic bonds is that they cannot be used with a high probability of success if after the initial bond is formed, the parts must be raised to a temperature close to or above the softening point of the solder. For example, with a solder comprised of gold and tin, the solidus line of the composition may be at approximately 280 degrees Centigrade. With thermodynamic bonds, the integrity of the solder may be jeopardized if the parts are later raised above that solidus line. This is an especially difficult problem when the parts must be maintained in a precise dimensional alignment, which is the case when lasers are bonded in an optical system. Thus, efforts recently have been directed toward developing bonds that will remain intact even at temperatures above the melting point of the original solder composition. In S. Bader, W. Gust, and H. Hieber, "Rapid Formation of Intermetallic Compounds by Interdiffusion in the Cu-Sn and Ni-Sn Systems," ACTA METAL. MATER. Vol. 43 (1995), at 329–337, there is discussed the use of binary intermetallic formulations that reportedly provide a solder system in which the usage temperature may be greater than the melting temperature of the original solder materials. Bader et als. teaches the use of a binary formation with no controlling elements.

Kinetic bonds (bonds controlled with the use of chemical reaction rates and controlling elements), may prove advantageous over thermodynamic bonds or pure binary bonds. With kinetically-controlled bonds, the timing of chemical reactions (kinetics) controls the degree of melting, oxidation, or chemical transformation and thereby the wetting, flow, and strength of the solder bond. For example, a solder comprising one or more layers of elements may be incorporated on one part or the other. Additional layers of solder elements may be added to the solder to cause the melting point of the solder to vary as the elements of the parts are absorbed within the solder. These additional layers are referred to herein as "quenching layers." Thus, freezing may be induced with the incorporation of quenching layers of additional elements rather than by solely lowering the temperature. In such solder arrangements, the bond can sometimes be made so that it will remain solid even at temperatures above the melting point of the original solder composition.

For example, a kinetically-controlled bond involving the use of quenching layers known in the art involves the use of a gold-tin (AuSn) solder in the bonding of gold (Au) or gold-covered parts. In the bonding of two parts, such as a laser chip and an optical sub-assembly substrate, a mixture of gold and tin is commonly used for a solder layer which is applied to one part, e.g., the substrate. In thin film applications, the solder layer typically will comprise a plurality of layers, such as alternating layers of gold and tin. The solder layer is melted by applying a temperature to it and the substrate that is slightly above the eutectic point of the solder, to ensure complete melting of the solder layer. Once the solder layer is melted, a quenching layer (such as an additional layer of gold), is added, and the second part (the laser chip), may then be applied on the quenching layer. Alternatively, one or more additional solder layers or quenching layers may be added before the second part is applied. As the solder and quenching layers freeze, they bond the two parts together.

With this process, the quenching layer increases the bond strength and provides some added control over the bonding. As the quenching layer is incorporated into the solder layer and the bond thus formed, the temperature at which the mixture is solid (the solidus line) rises as a function of the atomic fraction of gold in the mixture. Hence, the incorporation of additional gold (the quenching layer), which is not part of the original solder layer allows one to adjust the rate at which the material is brought to freezing, as opposed to by simply lowering the temperature. However, this type of solder bond remains difficult to control under most circumstances, because the additional elements often will be rapidly incorporated into the solder layer, such that the bond must be made quickly to avoid premature freezing. There generally remains a need for obtaining better control over this soldering process.

Another drawback with the above-described method (besides the rapidity of the reaction and the need to obtain greater control over the process), involves oxidation of the solder materials. Oxidation may occur before the bond is formed or during storage. Also, oxide layers and intermetallic compounds formed on the surface of the solder layer prior to bonding can cause a lack of, or a deficiency in, the metal-metal contact and lead to the formation of a bond with undesirable characteristics such as poor strength or low electrical conductivity. Oxidation is particularly problematic when tin (Sn) is used in the solder layer. When tin is used, it may diffuse to the surface of the solder and cause the formation of a layer of $SnO_2$. This may cause wetting problems during bonding, as the oxide ($SnO_2$) is moisture sensitive. The diffusion of tin in gold and the mutual diffusion of tin and gold is well-known to be rapid even at room temperature. See. e.g., L. Buene, "Interdiffusion and Phase Formation at Room Temperature in Evaporated Gold-Tin Films," THIN SOLID FILMS 47:159 (1977); S. Nakahara, R. McCoy, L. Buene, and J. M. Vandenberg, "Room Temperature Interdiffusion of Au/Sn Thin Film Couples," THIN SOLID FILMS 84:185 (1981); V. Simic and Z. Marinkovic, "Thin Film Interdiffusion of Au and Sn at Room Temperature," JOURNAL OF THE LESS COMMON METALS 51:177 (1977). Even if the solder layer is pure gold, such oxidation and wetting problems may arise.

Various methods are commonly used to prevent or reduce oxides, for example, storage in inert ambients such as argon; storage at very cold temperatures; the use of fluxes; or reducing the ambient atmospheres during the bonding process. These methods generally are rather costly due to storage or bonding conditions or the equipment required, and they may potentially impact on reliability or process safety. Some recent studies have explored the incorporation of nickel into the soldering structure as a barrier layer to seek to address difficulties encountered with interdiffusion. C. H. Lee, Y. M. Wong (an inventor herein), C. Doherty, K. L. Tai, E. Lane, D. D. Bacon, F. Baiocchi, and A. Katz, "Study Of Ni As A Barrier Metal In AuSn Soldering Application For Laser Chip/Submount Assembly," J. APPL. PHYS. 72:3808 (1992).

For further background regarding solder bonding, see U.S. Pat. No. 5,559,817, entitled "Compliant Layer Metallization," issued Sep. 24, 1996, to G. Derkits, an inventor herein, and J. Lourenco and R. Varma, which patent was assigned to Lucent Technologies, Inc., the assignee herein, and is incorporated herein by reference.

The present invention is addressed to improved methods of forming solder bonds and improved solder bond compositions. With the method of the present invention, greater control is achieved over the reaction rates and bonding process so improved bonds may be formed remaining solid even at temperatures above the melting point of the original solder composition. Oxidation of solder materials is also controlled. Further advantages may appear more fully upon consideration of the illustrative embodiments described in detail below in connection with the accompanying drawings.

SUMMARY OF THE INVENTION

Summarily described, the invention embraces a method of obtaining control over the soldering process and reaction rates and also preventing the oxidation of solder materials through incorporation of one or more additional control layers. A solder layer, preferably a multi-layer film, is used with a quenching layer to bind two parts together. A minority control layer of a transition element, preferably platinum, is disposed between the solder layer and the quenching layer. When heat is applied to the composition, the control layer is dissolved which allows the quenching layer to mix with the solder layer; thus, the interaction of the solder layer and quenching layer can be controlled with the additional control layer. The control layer can further act as an anti-oxidation or barrier layer, and additional control or barrier layers may be applied.

In a preferred embodiment, thin films of platinum are used to control the diffusion of gold (Au) into a gold-tin (Au-Sn) solder and to prevent oxidation of tin (Sn). The invention further embraces a composition for use in bonding a optical subassembly bonded to a laser chip which preferably is comprised of a solder layer of gold-tin (AuSn), a barrier layer of platinum (Pt), and a quenching layer of gold.

BRIEF DESCRIPTION OF THE DRAWINGS

For a better understanding of the invention, exemplary embodiments are described below, considered together with the accompanying drawings, in which.

It is to be understood that these drawings are for purposes of illustrating the concepts of the invention and are not to scale.

DETAILED DESCRIPTION OF THE INVENTION

This invention has particular application to technologies for bonding laser chips to optical sub-assemblies (OSAs) with hard (gold-tin) solders that should remain intact at high temperatures (325–350-C.). However, the invention has applications beyond the area of laser chips, including solder bonds in silicon and gallium arsenide circuits and the bonding of components to submounts and materials other than those involving gold and tin. Thus, although the description herein is directed principally to optical subassemblies and gold-tin solders, it should be understood that the invention pertains to other applications as well.

Figure 1:
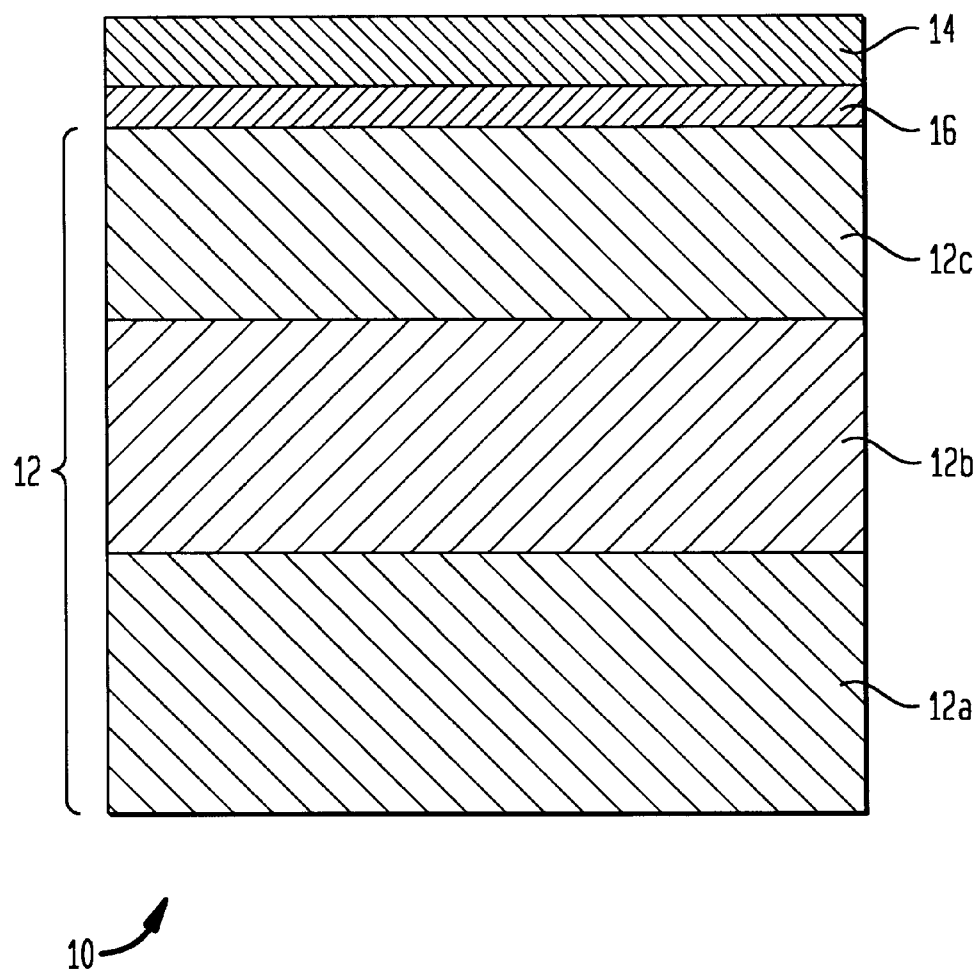
FIG. 1 is a schematic cross-section of a structure for solder bonding according to the present invention.

Referring to the drawings, FIG. 1 is a schematic cross section of a structure 10 for solder bonding in accordance with the invention, showing only the principal solder layers without the substrates to be bonded. The structure 10 for achieving the desired solder bond is a multilayered structure comprising at least one bond layer or solder layer 12, which is comprised of a plurality of alternating layers of solder material, 12a, 12b, and 12c. Typically in thin film applications, the solder layer is comprised of a plurality of layers, as shown in FIG. 1. A quenching layer 14 is used which induces the solidus line of the solder mixture to rise as it (the quenching layer) is incorporated into the solder 12. In accordance with the invention, disposed between the solder layer 12 and the quenching layer 14 is a control layer 16. The solder layer 12 and quenching layer 14 combination is referred to as a binary system for solder bonding. Since with the invention a control layer 16 is used between the solder and quenching layers, there is a deviation from the binary soldering structure.

Preferably, the control layer is comprised of an element that reacts more slowly with the solder material than the quenching material reacts with the solder material. The control layer is preferably: 1) thin in comparison to either the solder or quenching layers so it dissolves rapidly without changing the melting behavior of the binary substantially by its own action; 2) easily incorporated into the other layers; 3) a minority element so that the basic properties of the binary system remain unchanged and can be calculated using binary phase diagrams as approximations. The choice and thickness of this control layer permits control over the induced freezing (quenching) of the solder. The control layer prevents the material of the solder from interacting with material from the quenching layer for a period of time dictated by temperature and the thickness and composition of the layers.

Figure 2:
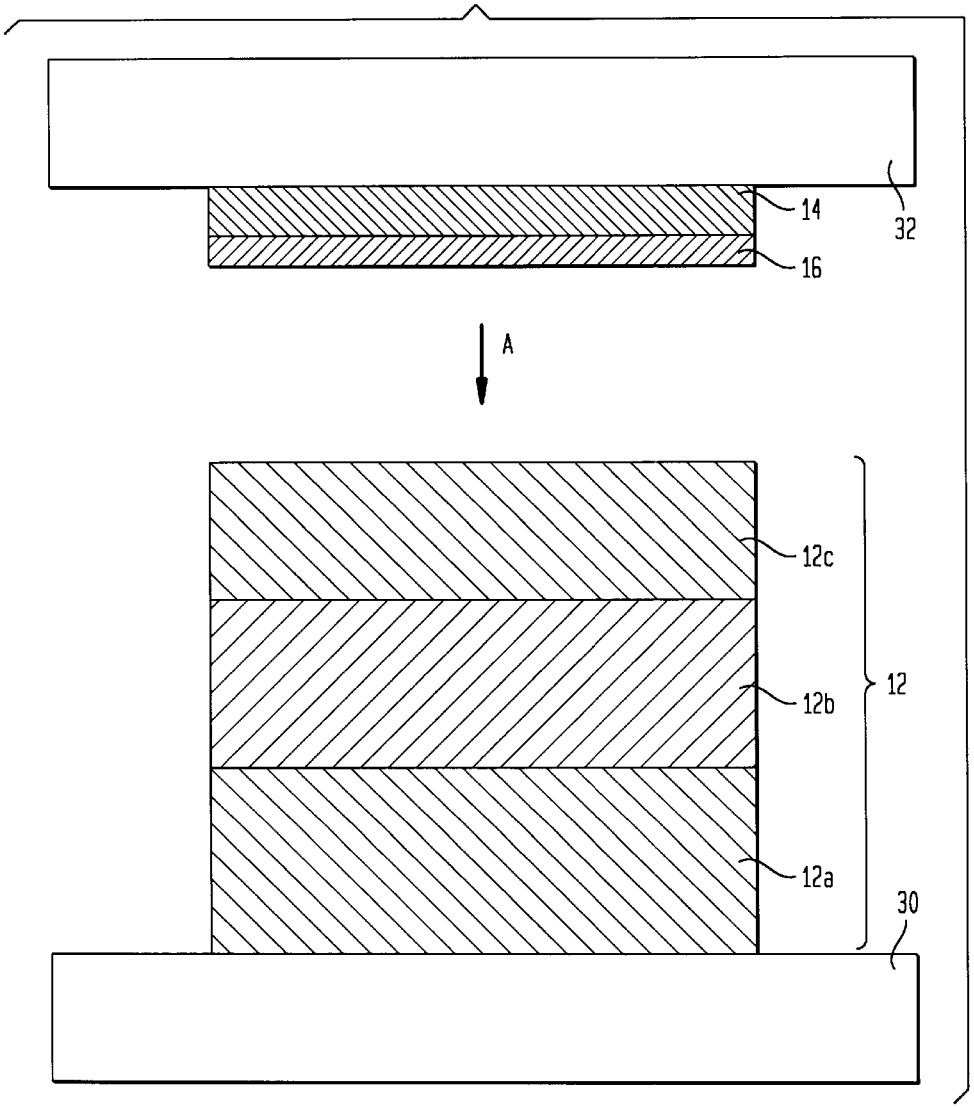
FIG. 2 illustrates the inventive method of solder bonding applying the structure of FIG. 1 between two parts to be bound together.

Referring to FIG. 2, there is illustrated a method of solder bonding according to the invention, applying the structure of FIG. 1. As in FIG. 1, there is shown the solder layer 12 comprised of a plurality of alternating layers 12a, 12b, and 12c, and the quenching 14 and control 16 layers. In FIG. 2, there also are shown the first part or base 30 and the second part 32 to be bonded together. In operation, according to one method of practicing the invention, the solder layer 12 is adhered to the base 30. The quenching layer 14 and control layer 16 are applied to the second part 32. The base 30 and solder 12 are heated to a temperature at or preferably above the melting point of the solder 12 to ensure complete mixing and to compensate for the later addition of other materials. For example, the eutectic point of a gold/tin solder typically is at about 280 degrees Centigrade; in such a case, the base may be heated to approximately 320 degrees Centigrade or more. The second part 32, with the quenching layer 14 and control layer 16, are then applied to the base 30 and solder 12, along the direction of arrow A. The heat of the solder 12 will cause the control layer 16 to dissolve into the solder 12. The dissolution of the control layer 16 frees the quenching layer 14, allowing the quenching layer to interact with the solder.

This process allows one to obtain greater control (as compared with prior methods), over the mixing of the quenching layer 14 with the solder layer 12 depending upon the time and temperature of the reactions and the thickness and composition of each of the layers. The control layer generally allows for higher temperatures, particularly during fabrication of the parts, and removes the need for long cool-down times. The control layer can be applied on one or both parts. Also, alternative to the process explained above with reference to FIG. 2, the control layer 16 and quenching layer 14 can be applied directly to the solder layer 12, before application of the second part 32 to be bonded, or they may be disposed between the solder layer 12 and the first part 30.

The preferred thicknesses of the layers is a function of the dimensional tolerances of the parts being bonded and the chemistry of the material used for the layers. In a preferred embodiment, the solder layer comprises alternating layers of gold and tin. Thus, for example, referring to FIGS. 1 and 2, the solder layer 12 comprises a first solder layer 12a of gold, a second solder layer 12b of tin, and a third solder layer 12c of gold. The control layer 16 is preferably comprised of platinum (Pt), but also may be comprised of a transition element such as iron (Fe), nickel (Ni), cobalt (Co), or palladium (Pd). The quenching layer 14 is preferably comprised of gold.

The invention offers flexibility with regard to the composition and arrangement of the solder layers, as is further illustrated below with reference to FIGS. 3–5. The solder layer 12 can be in multilayer thin film form as shown, or it can be a homogeneous mixture at or close to the eutectic point. Advantageously, it is a composite of two chemical elements, such as gold-tin (AuSn) or lead-tin (PbSn). When the solder layer is AuSn, the quenching layer advantageously is Au, and when the solder layer is PbSn, the quenching layer is preferably Pb. In any case, platinum is particularly advantageous for use as the control layer. Platinum may dissolve in a PbSn solder. See, e.g., B. Meagher, D. Schwarcz, M. Ohring, "Compound Growth in Pt/Sn-Pb Diffusion Couples," JOURNAL OF MATER. SCI. Vol. 31 (1996), at 5479–5486 (noting platinum will dissolve in a PbSn solder under appropriate conditions). There can be one quenching layer or plural quenching layers with plural control and barrier layers disposed between them. Each quenching layer further may be comprised of a mixture of metal layers, for example, alternating layers of Au, Sn, and Au. Alternatively, the quenching layer can be unitary, that is, comprised of a single chemical element as shown above.

The important thing is that the control layer intervene between the quenching and solder layers to prevent uncontrolled interaction between the two.

Figure 3:
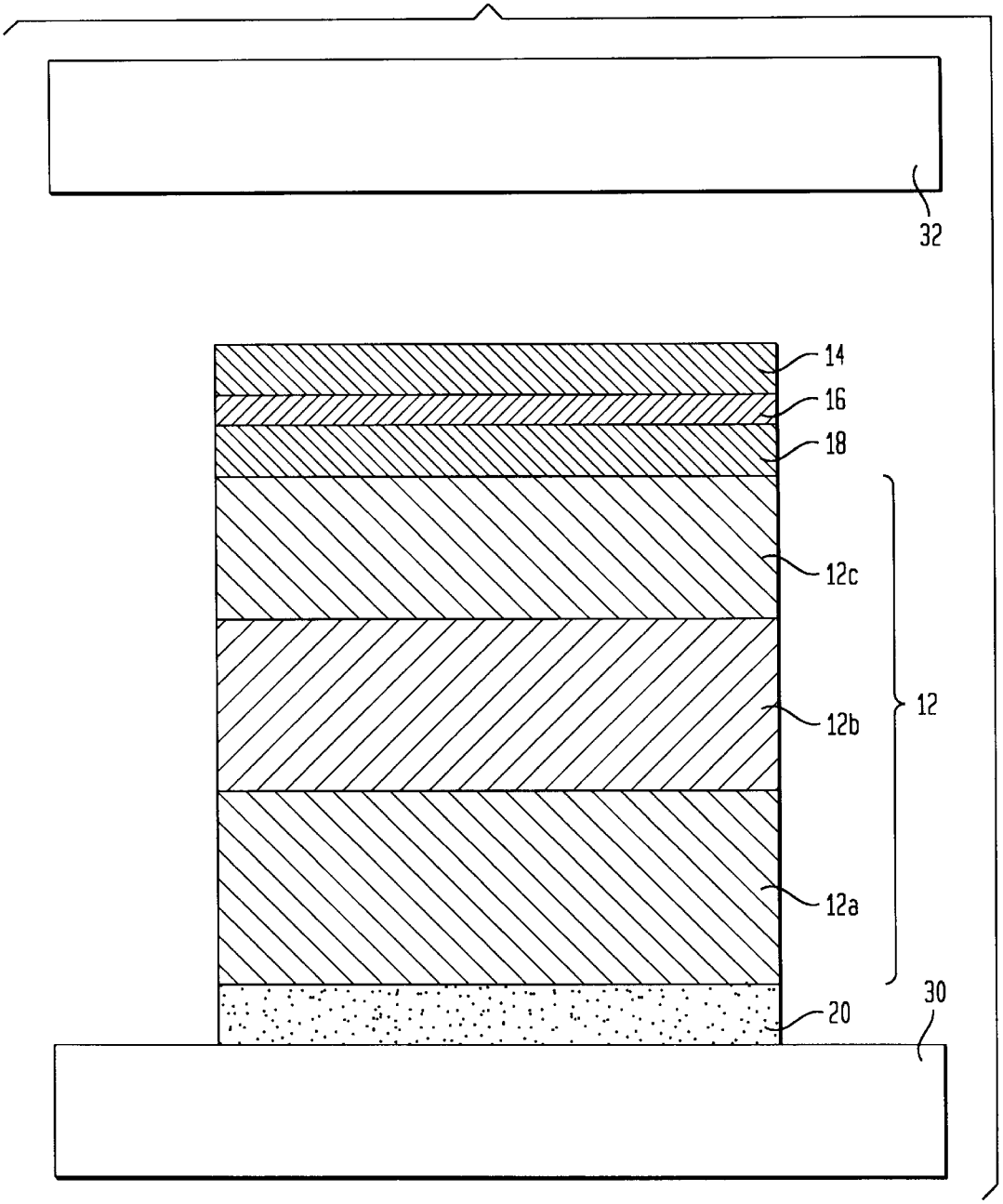
FIG. 3 shows a schematic cross-section of an alternate structure for solder bonding involving an oxidation barrier with attachment layers and also showing the substrates.

Referring to FIG. 3, there is shown the use of an antioxidation or barrier layer 18. As in FIG. 2, there is shown the solder layer 12 (comprised of three layers 12a, 12b, and 12c); the quenching layer 14; the control layer 16; and the two parts 30, 32 to be bonded together. Here, however, a barrier layer 18 is further disposed on the surface of the solder layer 12 or between the solder layer 12 and control layer 16. The barrier layer 18 prohibits undesired oxidation of the solder or oxidizable components thereof Additionally, an adhesive layer 20 may be disposed between the solder layer 18 and the base 30 to help secure the solder to the base. In one embodiment, when the base 30 is comprised of silicon and the solder layer comprises alternating layers of gold (12a), tin (12b), and gold (12c), the barrier layer 18 is advantageously comprised of platinum (Pt), with the adhesive layer 20 comprised of titanium (Ti). Instead of or in addition to placing the barrier layer 18 between the solder 12 and base 30, the barrier layer 18 and adhesive layer 20 may be disposed between the quenching layer 14 and the second part to be bonded 32. That is, referring to FIG. 3, the barrier layer 18 may be disposed on top of the quenching layer 14, with the adhesive layer 20 disposed between the barrier layer 18 and the second part 32. In any case, it should be understood that the presence of additional layers may influence the choice of thicknesses for the operative layers.

With the method of the present invention, control of the final solder is improved, as the platinum represents an independent type of control that is more robust than the layer thickness or temperature variables used in previous methods. This is due at least in part to the high activation energy for platinum penetration, which leads to a rapid bonding at a sufficiently high temperature, with very low values at temperatures typical of fabrication. Specifically, parts bonded with a AuSn solder to parts having Au and Pt layers have been shown to exhibit a time-dependent penetration of the Pt layer related to the Pt layer thickness. Thus, the Pt can be incorporated into the bond in a controlled fashion depending upon the variables for Pt thickness, AuSn composition, bond temperature, and bond time. Preferred variables for bonding a silicon substrate having a silicon dioxide surface layer to a semiconductor laser chip are provided below with reference to FIG. 5, and a method of determining structure characteristics given the temperature variable is described in Example I below with reference to FIG. 6.

This kinetic control can be obtained by application of the control and barrier layers to the two parts to be bonded, or alternatively to only one of the parts. FIG. 4 reflects an embodiment where the kinetic control principle operates as a co-function of two parts, that is, the barrier layer and the control layer are applied separately to the two parts, and then bonded together. FIG. 5 reflects an embodiment where the kinetic control principle operates basically as a function of one of the two parts, that is, the barrier layer and control layer are applied to one part (part B in FIG. 5), with the other part (part C), serving primarily as a bondable partner.

Figure 4:
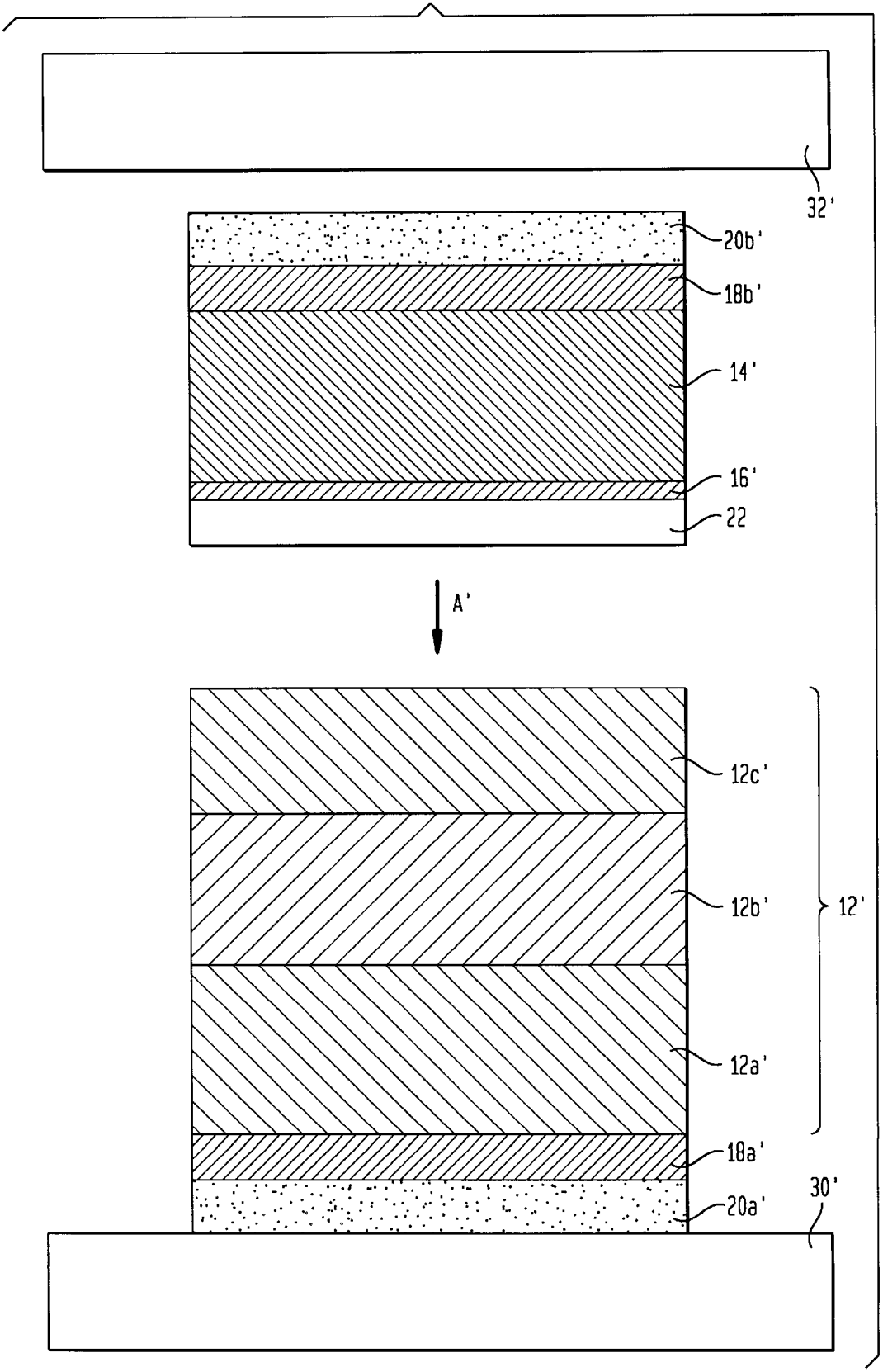
FIG. 4 shows a schematic cross-section of a two-part embodiment of the invention involving use of the kinetic control principle as a function of both parts.

More particularly, referring to FIG. 4, there is shown a solder layer 12' disposed on the surface of the first part 30.' The first part 30' may be comprised of silicon or silicon dioxide ($SiO_2$), with the second part 32' being part of a semiconductor laser chip. The solder layer 12' on the first part 30,' is preferably comprised of three alternating layers of gold (12a'), tin (12b'), and gold (12c'). The quenching layer 14' and control layer 16' are applied to the second part 32.' A first barrier layer 18a' and adhesive layer 20a' are applied between the solder layer 12' and the first part 30.' Additionally, a second barrier layer 18b' and adhesive layer 20b' are applied between the quenching layer 14' and the second part 32.' When a gold-tin solder is used to bond a laser chip to an OSA, the quenching layer 14' is preferably comprised of gold, the control layer 16' is preferably comprised of platinum, the first and second barrier layers 18a,' 18b,' are also preferably comprised of platinum, and the adhesive layers 20a,' 20b,' are preferably comprised of titanium (Ti). A final wetting layer of gold 22 may applied over the control layer 16.' In this embodiment, as can be seen, the control layer 16' which operates to control the mixing of the quenching layer 14' with the solder 12' is applied initially to only the second part 32.' Thus, with this embodiment the kinetic control (as opposed to thermodynamic control), over the freezing of the solder will only be initiated as the two parts are secured together along the direction of arrow A.'

Figure 5:
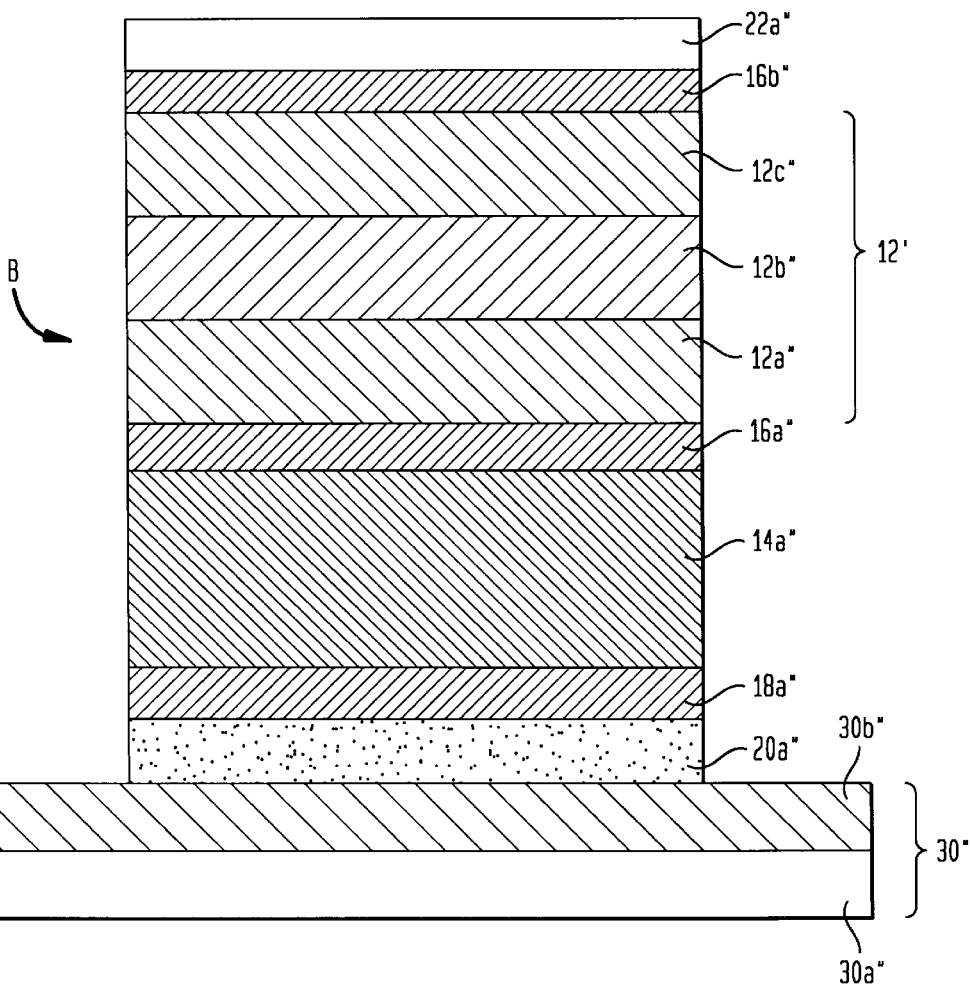
FIG. 5 shows a schematic cross-section of a two-part embodiment of the invention involving use of the kinetic control principle as a function of one part.

Referring to FIG. 5, there is shown an alternative soldering structure in which the kinetic control layer and the barrier layer are applied on the same part (in contrast to FIG. 4 where they are shown on different parts). For example, FIG. 5 shows a first part 30" comprised of a silicon substrate 30a" having a silicon dioxide (SiO$_2$) surface layer 30b." On the first part, a first adhesive layer 20a" of titanium of preferably about 1000 nm in thickness is applied to adhere a first barrier layer 18a" to the first part 30." The first barrier layer 18a" preferably comprises a layer of platinum of about 2000 nm in thickness. The quenching layer 14a," preferably of gold and about 10,000 nm in thickness, is applied directly on the first barrier layer 18a." The quenching layer 14a" is followed by a control layer 16a" of platinum, preferably of about 300 to 450 nm in thickness. Then the solder layer 12" comprising alternating layers of gold 12a" (about 500 to 5,700 nm), tin 12b" (about 5,700 to 7,000 nm) and gold 12c" (about 2,200 to 2,800 nm), is applied over the control layer, followed by a second control layer 16b" of platinum (about 35 to 90 nm), and a first wetting layer 22a" of gold (preferably about 500 nm in thickness). To the second part 32," there is applied a quenching layer of gold 14b" (preferably 4 microns in thickness), a third control layer of platinum 16c" (about 2,000 nm in thickness), and a second wetting layer 22b" of gold (about 1,500 nm in thickness).

The structure of FIG. 5 is important for it shows that both aspects of the kinetic control principle of the instant invention (i.e., control and anti-oxidation), can operate together (or simultaneously on the same part), to provide both resistance to surface oxidation during storage or preparation and controlled solidification of the solder material by use of a break-through control layer overlying the quenching layer. That is, on Part B, there is shown a barrier layer 18a" to control oxidation, and two control layers 16a," 16b," to control solidification of the solder. Also, the second control layer 16b" can serve both to control the bonding process and oxidation on the surface of the solder 12." With the structure of FIG. 5, the quenching process could proceed on both parts, with the second quenching layer 14b" acting simultaneously with the first quenching layer 14a," to adjust the melting point of the solder layer 12" from opposing directions; that is, the first quenching layer 14a" operates from the direction of the first part 30" at the first solder layer 12a," and the second quenching layer 14b" operates from the direction of the second part 32" at the third solder layer 12c." It may be desirable to incorporate this shared function of the layers due to practical constraints relating to thickness of the layers on a single part. In any event, these structures illustrate the flexibility of the kinetic control according to the invention and its applications to other designs.

EXAMPLE I

Calculating Structure Characteristics

Figure 6:
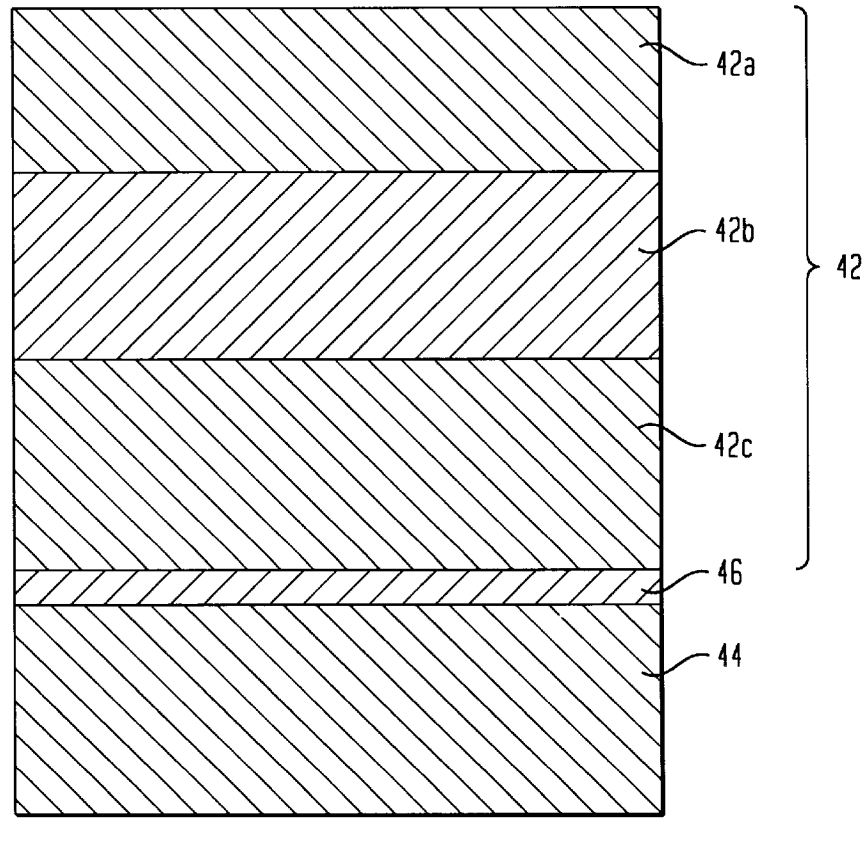
FIG. 6 shows a schematic cross-section of a two-part embodiment of the invention representing the structure which is the object of a working example discussed herein to assess the soldering characteristics based on layer thicknesses.

FIG. 6 represents a structure for illustrating calculations for determining the characteristics of a specific layer structure based on the use of binary phase diagrams for the solder system. Calculations are presented below as an executable MATHCAD program in MATHCAD 5.0 which is a program well known in the field to produce results in the form indicated below. The structure disclosed in FIG. 6 reflects a wetting layer 40 of gold of 150 nm in thickness; a solder layer 42 comprised of a first solder layer 42a of gold of 900 nm in thickness; a second solder layer 42b of tin at 1200 nm, and a third solder layer 42c of gold at 450 nm; a quenching layer 44 of gold at about 2500 nm in thickness; and a control layer of platinum 46 disposed between the solder and the quenching layer 44 at about 40 nm in thickness.

Calculations to determine layer thicknesses and the behavior of the structure generally can be made by applying the following five steps: 1) determining the solidus and liquidus lines in the region of compositions of interest; 2) applying the Lever Rule, a well known formula in the field, to determine the fraction of the solder that is liquid; 3) determining the atomic fraction of each element in a given set of thin film layers; 4) using published or experimentally-determined information on the dissolution rates of potential control materials to choose a control layer material that will dissolve at an appropriate time in the solder bond process; and 5) applying formulas known in the field to design a solder layer sequence that will have the properties of being liquid until the quenching layer is exposed and that will solidify once the control layer is dissolved and the quenching layer mixes with the solder. The supposition is made that the control layer is a minority element. To illustrate the invention, these steps are performed below considered with the solder structure of FIG. 6.

(1) Step 1: First, the liquid fraction of the solder for various compositions of the elements can be determined considering the amount of material in each layer and the mode of incorporating the materials into the solder. In this case, for example, to determine the solidus and liquid lines, we consider the Temperature T(X) as a function of the composition (X) of the material. We first invert the given T(X) function to derive the tin compositions along the solidus and liquidus lines:

$X\_Sn\_sol(T)$ and $X\_Sn\_liq(T)$.

The liquidus and solidus curves are transformed from composition to temperature variables. For convenience, the MATHCAD built-in Tolerance for internal variables may be set at TOL=$10^{-2}$. With regard to the functions for the liquidus and solidus curves in the area of interest, reference is made to J. Ciulik and M. R. Notis, "The Au-Sn Phase Diagram," JOURNAL OF ALLOYS AND COMPOUNDS, Vol. 191 (1993), at 71:

$T\_1(X\_Sn):=1450.9108-50.2161 \cdot X\_Sn+0.3393 \cdot X\_Sn^2$ .Liquidus Curve: 521° C.–280° C.

$T\_s(X\_Sn):=951.6940-56.5087 \cdot X\_Sn+1.0391 \cdot X\_Sn^2$ .Solidus Curve: 521° C.–280° C.

$X\_Sn:=20$ Initial Value for Root Finder

We can then define functions by inverson using the MathCAD built-in root function:

Solidus Composition Function as a function of temperature:

$$X\_Sn\_sol(T) := \text{root}(T - T\_s(X\_Sn), X\_Sn)$$

Liquidus Composition Function:

$$X\_Sn\_liq(T) := \text{root}(T - T\_l(X\_Sn), X\_Sn)$$

Step (2):

Using the solidus and liquidus functions, we can determine the fraction of material containing a given fraction of tin at a given temperature which is in the liquid phase, by applying the well-known LEVER RULE. In applying this rule, we take care to recognize the singularities which occur at the phase transitions and set the values of the liquid fraction to 1 in the solid region of the diagram and 0 in the pure liquid region of the diagram. In implementing this rule in MATHCAD, we first create an analytical function LVR (X,T) and then create a liquid fraction function LF(X,T) which includes the exceptions, as follows:

Lever Rule Function:

$$LVR(X\_Sn, T) := \frac{X\_Sn - X\_Sn\_sol(T)}{(X\_Sn\_liq(T) - X\_Sn\_sol(T))}$$

We can define the Liquid Fraction Function LF(X,T) by using the analytical function LVR(X_Sn,T) and applying the conditions that:

LF=0 below solidus line and
LF=1 above liquidus line.

$$LF(X\_Sn,T) := \text{if}(X\_Sn < X\_Sn\_sol(T), 0, \text{if}(X\_Sn > X\_Sn\_liq(T), 1, LVR(X\_Sn,T)))$$

e.g.: LF(30,350)=1

Step (3)

Next, the use of thin film structures as solder layers requires that a transformation be made from layer thickness to atomic fractions. In doing this, it is important to take into account the different atomic densities of the elements involved. Some correction can also be made when needed for the density of the deposited material in relation to its typical bulk or single crystal values. In this case, the assumption is made that all of the elements involved in these structures have a similar relationship of deposited density to bulk density and that no corrections need be made. This assumption may not be valid in all circumstances but the appropriate corrections can be made according to methods well-known to those skilled in the art.

Atomic fractions will be based on thicknesses using atomic masses and bulk densities to estimate atom numbers in layers, based on Au as a standard unit (i.e. everything can be ratioed to Au):

$$M\_Pt := 195.09 \quad M\_Au := 196.96 \quad M\_Sn := 118.69$$

$$Dn\_Pt := 21.45 \quad Dn\_Au := 19.3 \quad Dn\_Sn := 7.28,$$

where M_X indicates the atomic mass of element X and Dn_X indicates the density of element X, based on other standard references.

$$R\_Sn\_Au := \frac{Dn\_Sn}{Dn\_Au} \cdot \frac{M\_Au}{M\_Sn}, \quad R\_Sn\_Au = 0.626$$

i.e. Sn is less atomically dense than Au $$R\_Pt\_Au := \frac{Dn\_Pt}{Dn\_Au} \cdot \frac{M\_Au}{M\_Pt} R\_Pt\_Au = 1.122$$

i.e. Pt is more atomically dense than Au $$N\_Pt(Th\_Sn) := R\_Sn\_Au \cdot Th\_Sn$$

$$N\_Pt(Th\_Pt) := R\_Pt\_Au \cdot Th\_Pt$$

Therefore, we may get numbers of atoms in layers of a given thickness relative to layer of Au of the same thickness.

Step (4):

In selecting the barrier material, one may consider that in all practical applications, the dissolution of the control layer or barrier material into the solder may itself cause changes in the liquid composition of the solder, for example, by binding one of the elements of the solder more strongly than the partner element does and causing precipitation of the bound element. In the Au-Pt-Sn system, incorporation of Pt used as a control layer causes such changes. To accurately calculate the liquid fraction of the solder material, we consider platinum to be a "sink" for tin. Thus, we estimate that the material which precipitates can be represented roughly by the chemical composition of $AuPtSn_2$, and then we calculate an effective tin concentration of the remaining solder by removing from the binary composition an amount of tin appropriate to the platinum reacted. This same method can be used for other systems, for example, the Pt-Pb-Sn system or the Au-Co-Sn system, among others.

The function X_Sn_ef which is the effective tin concentration in the binary liquid as a function of the thicknesses of all three elements is used as the input to the Liquid fraction function:

$$X\_Sn\_ef(Th\_Pt, Th\_Sn, Th\_Au) :=$$

$$\frac{N\_Sn(Th\_Sn) - 2 \cdot N\_Pt(Th\_Pt)}{(N\_Sn(Th\_Sn) + Th\_Au - 3 \cdot N\_Pt(Th\_Pt))} \cdot 100$$

$$E.G.: \quad X\_Sn\_ef(0, 400, 700) = 26.345$$

$$LF(X\_Sn\_ef(0, 400, 700), 350) = 0.966$$

Therefore, material derived from a layered structure comprising initially 400 nm of Sn and 700 nm of Au has an effective tin concentration of 26.3% and, when raised to a temperature of 350 degrees Celsius, is 96.6% liquid.

Step (5):

We can apply this method, for example, to layered structures of the type illustrated in FIG. 6 and described above.

1. At the start of the solder bonding sequence, the solder is raised to a bonding temperature of 350 degrees Celsius. Only layer 42 (42a, 42b, and 42c) participates:

X_Sn_ef(0,1200,900+450)=35.749 LF(X_Sn_ef(0, 1200,1350),350)=1

The solder liquifies completely (i.e. LF=1).

2. When mixed with the Au 40 on the second part, the effective Sn concentration changes. Layers 42 and 40 participate:

X_Sn_ef(0,1200,900+450+150)+33.367 LF(X_Sn_ef (0,1200,1500),350)=1

The solder remains completely liquid (i.e. LF=1).

3. When the Pt control layer 46 dissolves, the effective Sn concentration changes again. Layers 42, 40, and 46 participate:

X_Sn_ef(40,1200,1500)=31.249 LF(X_Sn_ef(40, 1200,1500),350)=1

The solder remains completely liquid (i.e. LF=1).

4. Once the control layer is melted, complete mixing occurs rapidly between the solder and the quenching layer. Layers 40–46, including quenching layer 44, participate:

X_Sn_ef(40,1200,1500+2500)=14.326 LF(X_Sn_ef (40,1200,4000),350)=0

This last result shows that a structure having a 40 nm Pt control layer within a layer structure having a total of 1200 nm of Sn and 4000 nm of Au would show initial melting when exposed to 350 C., but as soon as the structure became well-mixed, the liquid content would go to 0, that is, it would solidify.

It will be understood that the embodiments described herein are merely exemplary and that a person skilled in the art may make variations and modifications without departing from the spirit and scope of the invention. All such variations and modifications are intended to be included within the scope of the appending claims.

We claim:

1. A soldering structure for use in achieving a kinetically-controlled solder bond comprising:

a solder layer having a predetermined thickness;

a quenching layer having a predetermined thickness and a composition selected so that the quenching layer will interact with the solder layer and so that, upon interacting with the solder layer, the quenching layer will increase the eutectic temperature of the solder layer; and a control layer having a predetermined thickness disposed between the solder layer and the quenching layer, wherein the control layer is fabricated with a transition metal and is sufficiently thin so that it will interact with the solder layer, the control layer thereby temporarily preventing the solder layer from interacting with the quenching layer for a period of time as a function of temperature and thickness of the control layer.

2. The soldering structure for use in solder bonding according to claim 1, in which the solder layer is a multilayer film comprised of alternating layers of metals selected from the group consisting of gold, tin, lead, and palladium; the control layer is comprised of platinum; and the quenching layer is a unitary layer comprised of a metal selected from the group consisting of gold and lead.

3. The soldering structure according to claim 1, further comprising a barrier layer disposed over the surface of the solder layer opposite the control layer for preventing the oxidation of the solder layer.

4. A method of for achieving a kinetically-controlled solder bond for securing a first member to a second member, the method comprising the steps of:

(a) providing a soldering structure according to claim 1; and (b) heating the solder layer to a temperature above the solidus line of the solder layer so that the solder layer is softened and dissolves the control layer and upon dissolving of the control layer, the quenching layer interacts with the solder layer to increase the eutectic temperature of the solder layer and cause the solder layer to solidify, thereby bonding the first member and the second member together, wherein the predetermined thickness and composition of the control layer may be selected to achieve the kinetically-controlled solder bond.

5. The method according to claim 4, in which the control layer is comprised of a metal selected from the group consisting of iron, nickel, cobalt, platinum, and palladium.

6. The method according to claim 4, in which the control layer is comprised of platinum and has a thickness of one-fifth or less relative to the thickness of either the solder layer or the quenching layer.

7. The method according to claim 6, in which the solder layer is a multi-layer film comprised of alternating layers of metals selected from the group consisting of gold, tin, lead, and palladium.

8. The method according to claim 7 in which the quenching layer is unitary and is selected from the group consisting of gold and lead.

9. The method according to claim 7, further comprising the step of disposing a barrier layer between one of the members and the soldering structure to prevent oxidation of the materials comprising the solder layer.

10. The method according to claim 9, wherein the barrier layer is fabricated from a metal selected from the group consisting of iron, nickel, cobalt, platinum, and palladium.

11. The method according to claim 4, in which the solder layer is comprised of gold and tin, the quenching layer is comprised of gold, and the control layer is comprised of platinum.

12. The method according to claim 4, in which the solder layer is comprised of lead and tin, the quenching layer is comprised of lead, and the control layer is comprised of platinum.

13. The method according to claim 4, in which one member is a laser chip and the other member is an optical sub-assembly.

14. The method of claim 4, wherein the first and second members have substantially planar surfaces to be bonded together; the soldering structure comprises a binary solder layer, a first and a second quenching layer, and a first and a second control layer, the first quenching layer and the first control layer being disposed between the solder layer and the first member, and the second quenching layer and the second control layer being disposed between the solder layer and the second member, each of the first and second control layers further being disposed between the solder layer and each of the first and second quenching layers, respectively, so that the first and second control layers prevent the solder layer from interacting with the first and second quenching layers, respectively for a period of time as a function of temperature and thickness of the first and second control layers.

15. A soldering structure for use in solder bonding comprising a plurality of overlapping layers, the layers comprising in the order of disposition:

a first quenching layer; a first control layer; a binary solder layer; a second control layer; and a second quenching layer, wherein each of the first and second quenching layers has a pre-determined thickness and a composition that, when the quenching layers interact with the solder layer, the quenching layers increase the eutectic temperature of the solder layer; and wherein each of the first and second control layers has a predetermined thickness such that when the control layers are fabricated with a transition metal, they prevent the solder layer from interacting with the first and second quenching layers for a period of time as a function of temperature and thickness of the control layers.

16. The soldering structure according to claim 15, further comprising a barrier layer disposed on at least one of the quenching layers opposite the first or second control layer.

17. A method of solder bonding for securing a first member to a second member, the method comprising the steps of:

(a) providing a soldering structure according to claim 15; and (b) heating the solder layer to a temperature above the solidus line of the solder layer so that the solder layer is softened and dissolves the first and second control layers to allow the first and second quenching layers to interact with the solder layer, so that the quenching layers increase the eutectic temperature of the solder layer and cause the solder layer to solidify, thereby bonding the first member and the second member together.

18. The method of claim 17, wherein step (a) comprises providing the soldering structure according to claim 16.

19. The soldering structure of claim 1, in which the control layer is sufficiently thin relative to the solder layer and the quenching layer so that it will dissolve upon heating of the solder layer without substantially changing the melting properties of the solder layer and the quenching layer.

20. The soldering structure of claim 19, in which the control layer is comprised of platinum and has a thickness of less than about 500 nm.

* * * * *